US011591770B2

(12) United States Patent
O'Halloran et al.

(10) Patent No.: US 11,591,770 B2
(45) Date of Patent: Feb. 28, 2023

(54) ARMREST-MOUNTED CONTROL DEVICE WITH FORE/AFT ADJUSTMENT

(71) Applicant: AGCO Corporation, Duluth, GA (US)

(72) Inventors: Christopher Paul O'Halloran, Hesston, KS (US); Aaron Loggan, Hesston, KS (US); Paul Linwood Holman, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 331 days.

(21) Appl. No.: 17/075,226

(22) Filed: Oct. 20, 2020

(65) Prior Publication Data

US 2021/0123210 A1 Apr. 29, 2021

Related U.S. Application Data

(60) Provisional application No. 62/925,342, filed on Oct. 24, 2019.

(51) Int. Cl.
*E02F 9/16* (2006.01)
*E02F 9/20* (2006.01)
*B60N 2/75* (2018.01)

(52) U.S. Cl.
CPC ............ *E02F 9/166* (2013.01); *E02F 9/2004* (2013.01); *B60N 2/773* (2018.02)

(58) Field of Classification Search
CPC ......... B60N 2/773; E02F 9/2004; E02F 9/166
See application file for complete search history.

(56) References Cited

U.S. PATENT DOCUMENTS 8,039,769 B2 * 10/2011 Asp ....................... B66F 9/0759 200/334
2006/0000656 A1 1/2006 Caterpillar
2006/0042857 A1 * 3/2006 Catton .................. B60N 2/767 180/334
2010/0187858 A1 * 7/2010 Ekren .................... B60N 2/773 296/190.01
2019/0077288 A1 * 3/2019 Gayon .................. B60N 2/797

FOREIGN PATENT DOCUMENTS

EP 2374657 A2 10/2011
EP 3023296 A1 5/2016

OTHER PUBLICATIONS

UK Intellectual Property Office, Search Repod for related UK Application No. GB1917854.0, dated Apr. 28, 2020.

* cited by examiner

*Primary Examiner* — Sarah B McPartlin

(57) ABSTRACT

A vehicle control device is mounted on an adjustable armrest assembly coupled to a frame of a vehicle. The longitudinal position of the vehicle control device and an armrest may be adjusted by rotating the armrest upward towards a vertical position, sliding the armrest forward or rearward relative to the base and into the desired position, and then rotating the armrest downward toward the horizontal position.

11 Claims, 5 Drawing Sheets

40 44 58 52 42 56 50 46 68 48 54 70 60 72 76 66

ARMREST-MOUNTED CONTROL DEVICE WITH FORE/AFT ADJUSTMENT

CROSS REFERENCE TO RELATED APPLICATIONS

This application claims the benefit of U.S. Provisional Application No. 62/925,342, filed Oct. 24, 2019, which is hereby incorporated by reference in its entirety.

BACKGROUND OF THE INVENTION

Field of Invention

The present disclosure is generally related to control systems for agricultural vehicles and more particularly a vehicle control device mounted on an adjustable armrest assembly.

Description of Related Art

Operators of agricultural vehicles routinely spend longs hours in the field because ideal windows for performing necessary tasks can often be very small. To reduce operator fatigue, it is desirably to make the operator cab of the agricultural vehicle as functional and comfortable as possible. Vehicles typically have operator seats provided with armrests for users to rest or support their arms in an ergonomic configuration and to aid the user in sitting and standing from the seat. It is also known to mount control devices for the vehicle so as to enable the driver to control a number of functions of the vehicle with his or her hand, while the operator's forearm rests on the armrest of the operator's seat. Many conventional seats are provided with armrests that are not adjustable relative to a remainder of the seat or to the control device. These fixed armrests may be unsuitable for accommodating the needs of operators of different statures (e.g., different heights).

Some conventional operator seats are provided with adjustable armrests. However, many conventional adjustable armrests include a large number of components or otherwise have a complicated construction, which makes such conventional adjustable armrests costly, cumbersome to use, and/or prone to a high rate of failure.

It is therefore desirable to have an improved armrest mounted control device that provides enhances comfort in a compact space while enabling quick and easy adjustment to aid the operator in finding their optimal running position. It is further desirable to have an adjustable armrest assembly that is of relatively simple construction compared to conventional adjustable armrests, which may lead to increased durability and a reduced failure rate.

BRIEF SUMMARY OF THE INVENTION

Briefly stated, one aspect of the invention is directed to a vehicle control device mounted on an adjustable armrest assembly coupled to a frame of a vehicle. The longitudinal position of the vehicle control device and an armrest may be adjusted by rotating the armrest in a first direction (e.g., rotating the armrest upward towards a vertical position), sliding the armrest forward or rearward relative to the base and into the desired position, and then rotating the armrest in a second direction opposite to the first (e.g., rotating the armrest downward toward the horizontal position).

Another aspect of the invention is directed to a vehicle having an operator cab, the vehicle includes an operator seat assembly positioned in the operator cab, a vehicle control device, and an armrest assembly positioned adjacent the operator seat. The armrest assembly includes an assembly base having a shuttle track and a series of position selection openings, an armrest frame and an armrest support portion attached to the armrest frame. The armrest assembly also includes a shuttle configured to engage with and move along the shuttle track, the control device being mounted on the shuttle so as to move therewith, wherein the armrest frame is mounted on the shuttle with a hinge connection at one end of the armrest support portion. A locking mechanism selectively prevents longitudinal movement of the shuttle along the shuttle track when the locking mechanism is in a locked condition. The longitudinal position of the vehicle control device and the armrest support portion may be adjusted by rotating the armrest frame in a first direction about the hinge connection to disengage the locking mechanism into an unlocked condition, sliding the shuttle relative to the shuttle track into the desired position, and then rotating the armrest frame in a second direction opposite to the first direction to reengage the locking mechanism into the locked condition.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF PREFERRED EMBODIMENTS

Figure 1:
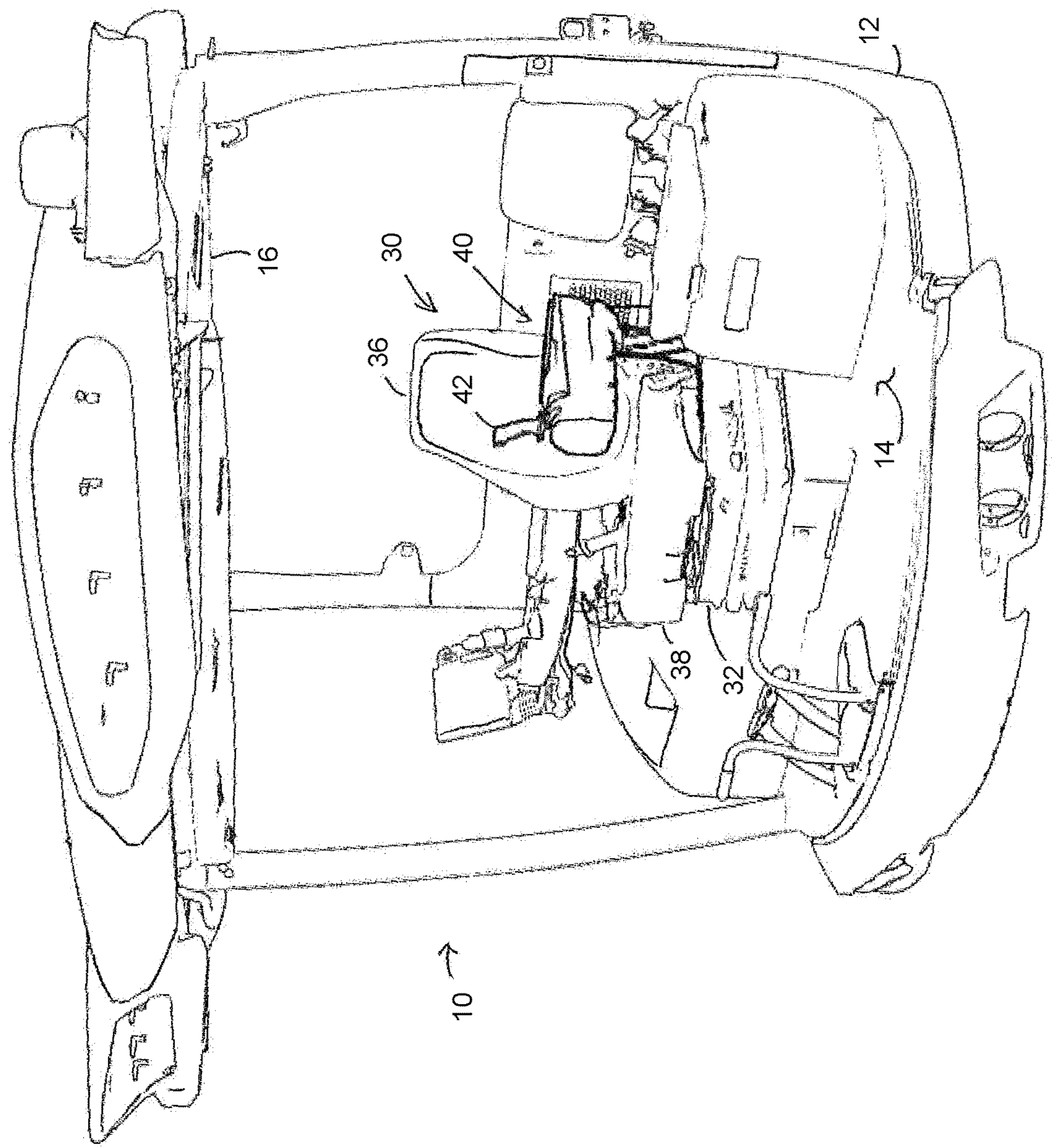
FIG. 1 is a perspective view of a cab of agricultural vehicle having an operator station with an adjustable armrest assembly with a vehicle control device.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

The present disclosure is directed to various embodiments of a vehicle control device mounted on an adjustable armrest assembly coupled to a frame of the vehicle. Turning now to the Figures, an operator cab 10 for a vehicle 11, such as an agricultural tractor or combine harvester, includes a frame 12 with a roof 14 and a floor 16 defining an interior region of the operator cab 10 as shown in FIG. 1. Front and side windows desirably extend between the floor 16 and the roof 14 to allow the operator to observe the work area surrounding the vehicle. An operator seat assembly 30 is positioned in the operator cab 10. The operator seat assembly 30 and includes a seat base 32, seat 34, and back support 36. An armrest assembly 40 is coupled to the seat base 32 or otherwise connected to the frame 12 of the vehicle. A vehicle control device 42 is mounted on the armrest assembly 40. As would be understood by one skilled in the art, the control device is used to control specific functions of the vehicle. It is also contemplated that the armrest assembly 40 is coupled to the frame 12 of the agricultural vehicle for situations where the operator is required to stand or partially stand/lean in the cab 10 to operate the vehicle 11.

Figure 2:
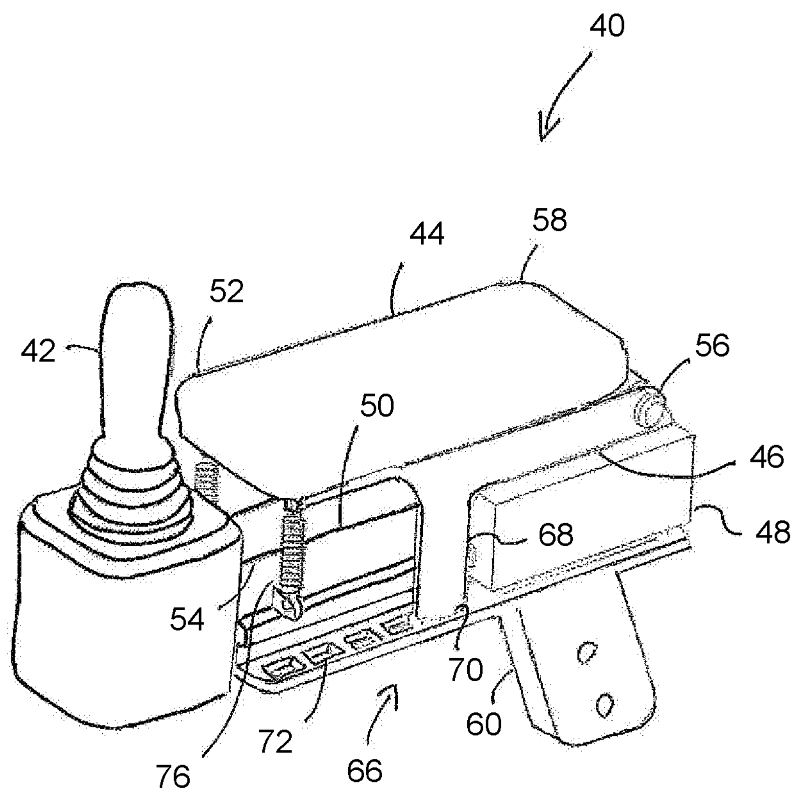
FIG. 2 is a perspective view of the adjustable armrest assembly.

Referring now to FIG. 2, one embodiment of the armrest assembly 40 and control device 42 is illustrated. The armrest assembly 40 comprises an armrest support portion 44 attached to an armrest frame 46. The armrest support portion 44 is preferably made of a padded material and is positioned on the armrest assembly 40 so that the hand of the operator of the vehicle 11 can reach and operate the control device 42 comfortably when the forearm of the operator is resting on the armrest support portion 44. The control device 42 may include, for example, and not by way of limitation, a vehicle speed control device, a steering control device, or combinations thereof. It should be understood by those skilled in the control device 42 may be a joystick, lever, knob, touch screen control interface or other known control mechanism.

The armrest frame 46 and the control device 42 are mounted on a shuttle 48 that runs in generally a longitudinal direction with respect to the vehicle cab 10 and direction of travel of the vehicle 11. In one embodiment, the shuttle 48 has a shuttle neck 50 that runs underneath and extends past a forward end 52 of the armrest support portion 44. The control device 42 is mounted at a distal end 54 of the shuttle neck 50. The armrest frame 46 is connected to the shuttle 48 with a hinge connection 56 at one end of the armrest support portion 44. In the illustrated embodiment, the hinge connection 56 is at a rear end 58 of the armrest support portion 44.

The armrest assembly 40 has an assembly base 60 that is fixed to the seat base 32 (FIG. 1) or otherwise connected to the frame 12 of the vehicle cab 10. The shuttle 48 engages a shuttle track 62, best seen in FIGS. 4 and 5, fixed to the assembly base 60. A locking mechanism 66 prevents longitudinal movement of the shuttle 48 on the shuttle track 62. In one embodiment, the locking mechanism 66 comprises at least one downwardly extending arm 68 having a detent 70 at a lower end configured to engage with a series of armrest positioning notches 72, broadly position selection openings, in the assembly base 60 located alongside a portion of the shuttle track 62. Desirably the armrest frame 46 has a pair of downwardly extending arms 68, with one arm 68 on either side of the shuttle neck 50. When the armrest support portion 44 is in a lowered condition, the detent 70 on the arm 68 engages with a selected notch 72 thereby preventing longitudinal movement of the shuttle 48 on the shuttle track 62. A biasing mechanism 76 biases the armrest frame 46 in the downward or locked condition. In the illustrated embodiment, the biasing mechanism 76 comprises a pair of helical extension springs. A first end of each spring 76 is connected to the armrest support portion 44 and a second end of each spring is connected to the shuttle neck 50. However one skilled in the art will understand that the biasing mechanism 76 may comprise other biasing means such as one or more torsion springs, gas springs or other known biasing mechanisms without departing from the scope of the invention.

Figure 3:
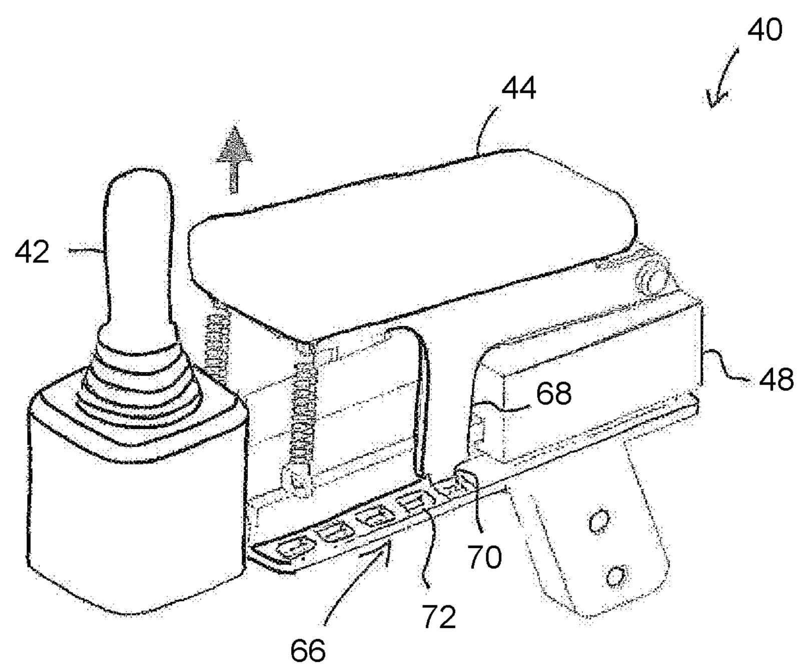
FIG. 3 is another perspective view of the adjustable armrest assembly.
Figure 4:
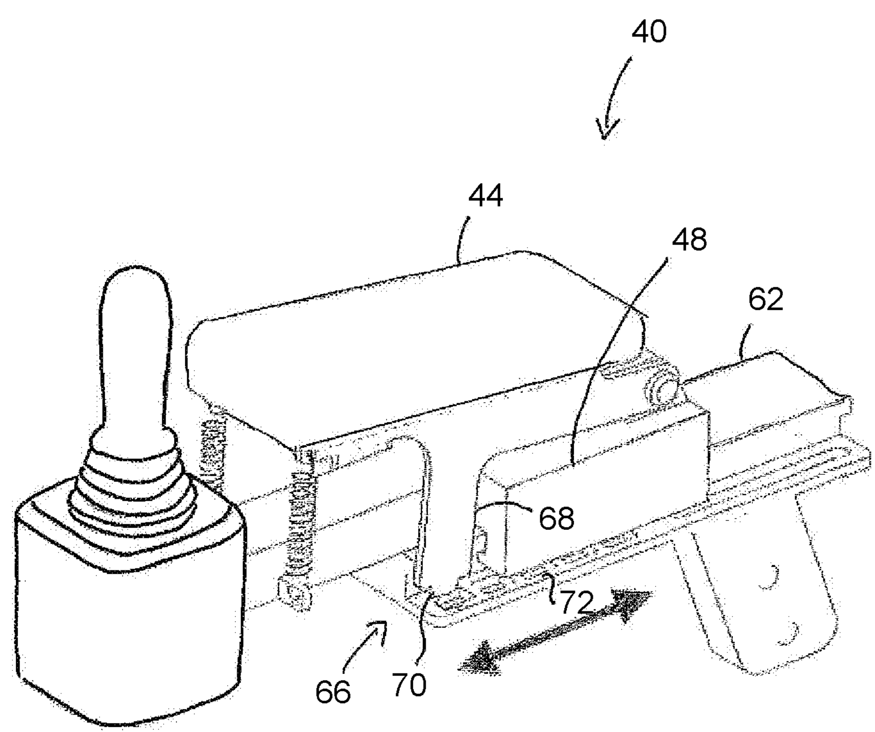
FIG. 4 is another perspective view of the adjustable armrest assembly.
Figure 5:
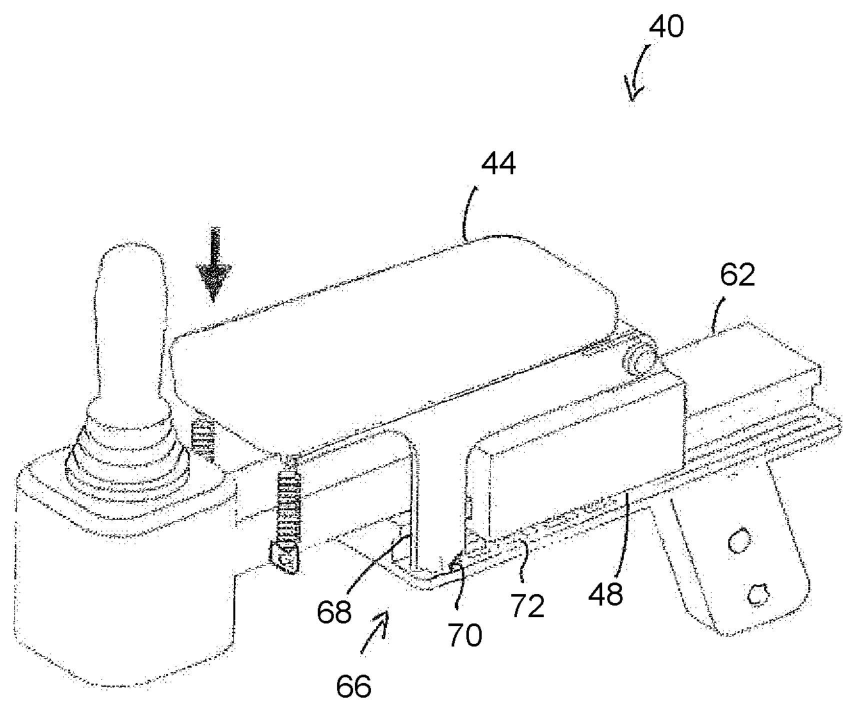
FIG. 5 is another perspective view of the adjustable armrest assembly.

The longitudinal position of the vehicle control device 42 and the armrest support portion 44 may be adjusted by rotating the armrest frame 46 in a first direction (e.g., rotating the armrest support portion 44 upward towards a vertical position) about the hinge connection 56 to disengage the locking mechanism 66 as shown in FIG. 3, sliding the shuttle 48 forward or rearward relative to the assembly base 60 along the shuttle track 62 and into the desired position as shown in FIG. 4, and then rotating the armrest frame 46 in a second direction opposite to the first direction (e.g., rotating the armrest support portion 44 downward toward the horizontal position) to reengage the locking mechanism 66 as shown in FIG. 5.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A vehicle (11) having an operator cab (10), the vehicle comprising:

- an operator seat assembly (30) positioned in the operator cab;
- a vehicle control device (42);
- an armrest assembly (40) positioned adjacent the operator seat, the armrest assembly comprising; an assembly base (60) having a shuttle track (62) and a series of position selection openings (72);
- an armrest frame (46);
- an armrest support portion (44) attached to the armrest frame (46);
- a shuttle (48) configured to engage with and move along the shuttle track, the control device (42) being mounted on the shuttle so as to move therewith, wherein the armrest frame is mounted on the shuttle with a hinge connection at one end of the armrest support portion; and a locking mechanism configured to selectively prevent longitudinal movement of the shuttle along the shuttle track when the locking mechanism is in a locked condition; wherein the longitudinal position of the vehicle control device and the armrest support portion may be adjusted by rotating the armrest frame in a first direction about the hinge connection to disengage the locking mechanism into an unlocked condition, sliding the shuttle relative to the shuttle track into the desired position, and then rotating the armrest frame in a second direction opposite to the first direction to reengage the locking mechanism into the locked condition.

2. The vehicle of claim 1 wherein the control device is a joystick, a lever, a knob, or a touch screen control interface.

3. The vehicle of claim 1 wherein the shuttle moves in a longitudinal direction with respect to the vehicle.

4. The vehicle of claim 1 wherein the shuttle has a shuttle neck (50) that runs underneath and extends past a forward end (52) of the armrest support portion and the control device is mounted at a distal end (54) of the shuttle neck.

5. The vehicle of claim 1 wherein the hinge connection is at a rear end of the armrest support portion.

6. The vehicle of claim 1 wherein the assembly base is fixed to the operator seat.

7. The vehicle of claim 1 wherein the locking mechanism comprises at least one downwardly extending arm (68) having a detent (70) at a lower end configured to engage with the series of armrest position selection openings, and when the armrest support portion is in a lowered condition, the detent on the arm engages with a selected opening, thereby preventing longitudinal movement of the shuttle along the shuttle track.

8. The vehicle of claim 7 wherein the armrest frame has a pair of downwardly extending arms, with one arm on either side of the shuttle.

9. The vehicle of claim 1 further comprising a biasing mechanism configured to bias the armrest frame in the locked condition.

10. The vehicle of claim 9 wherein the biasing mechanism comprises at least one spring, wherein a first end of the spring is connected to the armrest support portion and a second end of the spring is connected to the shuttle neck.

11. The vehicle of claim 10 wherein the spring comprises a helical extension spring.

* * * * *